US012355173B2

(12) United States Patent
Mamiya

(10) Patent No.: US 12,355,173 B2
(45) Date of Patent: Jul. 8, 2025

(54) MALE TERMINAL FITTING AND TERMINAL FITTING STRUCTURE

(71) Applicant: SUMITOMO WIRING SYSTEMS, LTD., Mie (JP)

(72) Inventor: Yuma Mamiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 461 days.

(21) Appl. No.: 17/891,174

(22) Filed: Aug. 19, 2022

(65) Prior Publication Data

US 2023/0053771 A1 Feb. 23, 2023

(51) Int. Cl.
*H01R 13/05* (2006.01)
*H01R 101/00* (2006.01)

(52) U.S. Cl.
CPC ....... *H01R 13/055* (2013.01); *H01R 2101/00* (2013.01)

(58) Field of Classification Search
None
See application file for complete search history.

(56) References Cited

U.S. PATENT DOCUMENTS

| | | | | |
|---|---|---|---|---|
| 4,992,064 A * | 2/1991 | Steinhardt | H01R 13/04 | 439/845 |
| 6,077,131 A * | 6/2000 | Fukuda | H01R 13/04 | 439/884 |
| 6,790,106 B2 * | 9/2004 | Ito | H01R 43/16 | 439/877 |

FOREIGN PATENT DOCUMENTS

JP 2013-089309 A 5/2013

* cited by examiner

*Primary Examiner* — Ross N Gushi
(74) *Attorney, Agent, or Firm* — Venjuris, P.C.

(57) ABSTRACT

The tab portion extends along a front-rear direction and includes a bottom wall portion, a first side wall portion continuously rising from one end part in a width direction intersecting the connecting direction, out of the bottom wall portion, a second side wall portion continuously rising from the other end part in the width direction, and an upper wall portion continuously extending from an upper end part of the first side wall portion toward an upper end part of the second side wall portion and overlapping the upper end part of the second side wall portion. A first recess extending along the connecting direction and recessed downward is provided in a central part in the width direction in an upper surface of the upper wall portion.

11 Claims, 9 Drawing Sheets

MALE TERMINAL FITTING AND TERMINAL FITTING STRUCTURE

CROSS-REFERENCE TO RELATED APPLICATIONS

This application is based on and claims priority from Japanese Patent Application No. 2021-135324, filed on Aug. 23, 2021, with the Japan Patent Office, the disclosure of which is incorporated herein in its entirety by reference.

TECHNICAL FIELD

The present disclosure relates to a male terminal fitting and a terminal fitting structure.

BACKGROUND

A male terminal fitting disclosed in Japanese Patent Laid-open Publication No. 2013-089309 is known as a male terminal fitting (connector male terminal) of an electrical connector. This male terminal fitting is provided with a recessed groove in a part where a female terminal fitting (connector female terminal) slides and passes when the male terminal fitting is connected to the connector female terminal. Since a slide contact area of the male terminal fitting and the female terminal fitting is reduced by providing the recessed groove, it is desired to form a wide recessed groove to reduce insertion resistance at the time of fitting connection. Note that this male terminal fitting has a solid structure without including a hollow part in a body part where the recessed groove is provided.

SUMMARY

On the other hand, unlike the above, it is known to configure a male terminal fitting having a hollow structure by bending a thin plate material by press-molding. A width of a recessed groove is limited since bending is involved for the male terminal fitting having this hollow structure.

The present disclosure was developed in view of the above situation and aims to provide a technique for reducing insertion resistance at the time of connection to a female terminal fitting while ensuring electrical connection to the female terminal fitting for a male terminal fitting having a hollow part.

The present disclosure is directed to a male terminal fitting with a tab portion to be connected to a female terminal fitting and a supporting portion continuous with the tab portion along a connecting direction to the female terminal fitting, wherein the tab portion extends along the connecting direction and includes a bottom wall portion, a first side wall portion continuously rising from one end part in a width direction intersecting the connecting direction, out of the bottom wall portion, a second side wall portion continuously rising from the other end part in the width direction, and an upper wall portion continuously extending from an upper end part of the first side wall portion toward an upper end part of the second side wall portion and overlapping the upper end part of the second side wall portion, and a first recess extending along the connecting direction and recessed downward is provided in a central part in the width direction in an upper surface of the upper wall portion.

According to the present disclosure, it is possible to reduce insertion resistance at the time of connection to a female terminal fitting while ensuring electrical connection to the female terminal fitting for a male terminal fitting having a hollow part.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
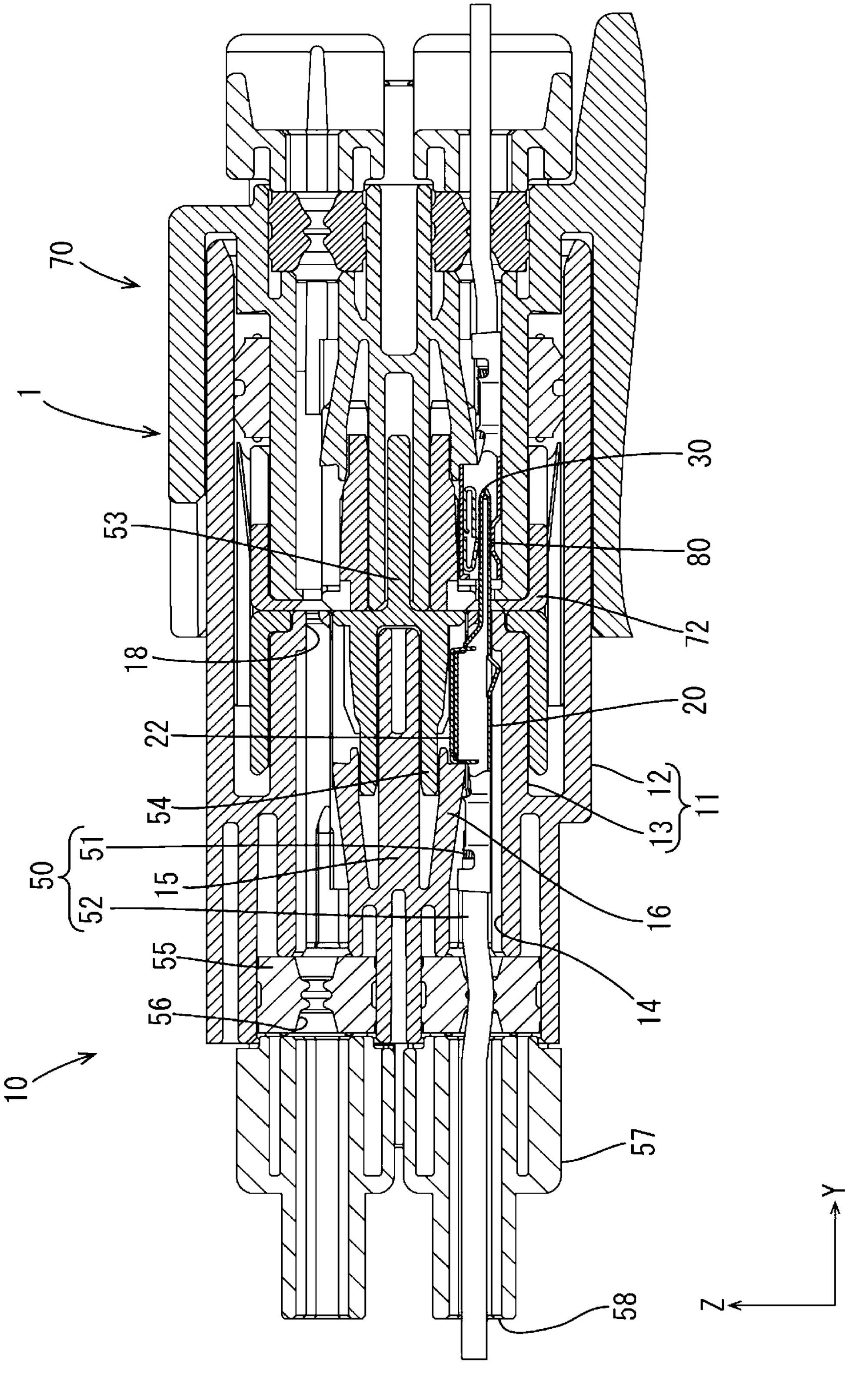
FIG. 1 is a section showing a connector including a terminal fitting structure according to one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The male terminal fitting according to the present disclosure is provided with a tab portion to be connected to a female terminal fitting and a supporting portion continuous with the tab portion along a connecting direction to the female terminal fitting, wherein the tab portion extends along the connecting direction and includes a bottom wall portion, a first side wall portion continuously rising from one end part in a width direction intersecting the connecting direction, out of the bottom wall portion, a second side wall portion continuously rising from the other end part in the width direction, and an upper wall portion continuously extending from an upper end part of the first side wall portion toward an upper end part of the second side wall portion and overlapping the upper end part of the second side wall portion, and a first recess extending along the connecting direction and recessed downward is provided in a central part in the width direction in an upper surface of the upper wall portion.

The bottom wall portion, the first side wall portion, the second side wall portion and the upper wall portion of the tab portion are connected and configured to surround a hollow part in a center. Although described in detail later, the tab portion is typically configured by bending a thin plate material in the form of a flat plate in which the bottom wall portion, the first side wall portion, the second side wall portion and the upper wall portion are connected. When the tab portion thus configured is bent, it is possibly difficult to thin the wall portions near corner parts, i.e. provide recesses to maintain the molding accuracy of the corner parts where the respective wall portions are continuous. In the above configuration, the first recess is provided in the upper surface of the upper wall portion having one end serving as a free end not continuous with the second side wall portion. Since the upper wall portion is configured to overlap the upper end part of the second side wall portion, the upper wall portion can be wider, for example, than the facing bottom wall portion and the second side wall portion and the first recess can be provided without impairing the molding accuracy of the corner parts. By providing the first recess in the upper wall portion in this way, insertion resistance at the time of connection to the female terminal fitting can be reduced. Further, the upper surface of the upper wall portion can electrically contact the female terminal fitting on both sides of the first recess. In this way, the insertion resistance at the time of connection to the female terminal fitting can be reduced while electrical connection to the female terminal fitting is ensured for the male terminal fitting having the hollow part.

(2) In one preferred aspect of the male terminal fitting according to the present disclosure, a dimension in the width direction of the first recess is 45% or more and 80% or less of a separation distance between the first and second side wall portions. According to this configuration, the first recess can be made wider while the molding accuracy of the corner part connecting the upper wall portion and the first side wall portion is maintained.

(3) In one preferred aspect, a thickness in the first recess of the upper wall portion is 60% or more and 95% or less of a maximum thickness in a corner part between the upper wall portion and the first side wall portion. According to this configuration, the insertion resistance at the time of connection to the female terminal fitting can be reliably reduced while the thickness of the upper wall portion is ensured. Note that the thickness in this technique means a dimension corresponding to a thickness of the thin plate material as a constituent material of the tab portion (in other words, dimension in a thickness direction orthogonal to plate surfaces).

(4) In one preferred aspect, a dimension in the width direction of the bottom wall portion is larger than a dimension in a vertical direction of the first side wall portion, a second recess extending along the connecting direction and recessed upward is provided in a central part in the width direction in a lower surface of the bottom wall portion, and a dimension in the width direction of the second recess is smaller than that of the first recess. According to this configuration, since the second recess is provided in the bottom wall, the insertion resistance at the time of connection to the female terminal fitting can be further reduced. Further, since the second recess is relatively narrower than the first recess, it is possible to avoid a situation where the molding accuracy of the corner parts continuous with the first and second side wall portions is affected on both ends of the bottom wall portion while a wide electrical contact area at the time of connection is secured.

(5) In one preferred aspect, the dimension in the width direction of the second recess is 55% or more and 85% or less of the dimension in the width direction of the first recess. According to this configuration, the second recess can be made wider while the molding accuracy of the corner parts is maintained.

(6) In one preferred aspect, the male terminal fitting includes a first tip part continuous with a front end of the upper wall portion and inclined downward toward a front side and a second tip part continuous with a front end of the bottom wall portion, inclined upward toward the front side and in contact with the first tip part, the first recess extending up to an upper surface of the first tip part. According to this configuration, the insertion resistance at the time of connection to the female terminal fitting can be more effectively reduced.

(7) In one preferred aspect, a step portion recessed upward is provided in a region overlapping the upper end part of the second side wall portion, out of a lower surface of the upper wall portion. According to this configuration, the dimension in the vertical direction of the second side wall portion can be increased by as much as a step in the step portion. That result is suitable since the molding accuracy of the corner part connecting the bottom wall portion and the second side wall portion can be maintained and springback caused by bending can be suppressed.

(8) In one preferred aspect, a dimension in the vertical direction of an upward rising part of the second side wall portion from an upper surface of the bottom wall portion is larger than a dimension in the width direction of the second side wall portion. According to this configuration, the dimension in the vertical direction corresponding to a length of the second side wall portion is set sufficiently longer than a dimension in the width direction corresponding to a thickness. In this way, the shape of the tab portion can be stabilized by suppressing the occurrence of springback of the second side wall portion having the upper end part serving as the free end.

(9) A terminal fitting structure according to the present disclosure is provided with the male terminal fitting of any one of (1) to (8) described above and a female terminal fitting to be connected to the male terminal fitting, wherein the female terminal fitting includes a connecting tube portion, the male terminal fitting being inserted into the connecting tube portion, and a resiliently deformable resilient connection piece disposed inside the connecting tube portion, the connecting tube portion has a connecting wall at a position facing the resilient connection piece, and the male terminal fitting is sandwiched and electrically connected between the resilient connection piece and the connecting wall.

Since the male terminal fitting of the above configuration includes the first recess, insertion resistance at the time of connection to the female terminal fitting can be reduced while electrical connection to the female terminal fitting is maintained on both sides of the first recess when the male terminal fitting is sandwiched between the resilient connection piece and the connecting wall. In this way, the terminal fitting structure is provided which is easily connectable and has good electrical connection. Note that such effects are suitable since being more clearly exhibited in the case of adopting a terminal fitting including no projection on mutually facing surfaces of a resilient connection piece and a connecting wall as the female terminal fitting.

(10) In one preferred aspect of the terminal fitting structure according to the present disclosure, the upper wall portion comes into contact with the resilient connection piece when the male terminal fitting is inserted into the connecting tube portion. Since the upper wall portion is configured to overlap the second side wall portion from above in the male terminal fitting of the present technique, the upper wall portion can be reliably supported by the second side wall portion when the male terminal fitting is connected to the female terminal fitting and the resilient connection piece is pressed against the upper wall portion. In this way, a downward displacement of the male terminal fitting due to a resilient force of the resilient connection piece of the female terminal fitting can be suppressed and the electrical connection of the male terminal fitting and the female terminal fitting can be stably maintained.

(11) In one preferred aspect, the bottom wall portion comes into contact with the connecting wall when the male terminal fitting is inserted into the connecting tube portion. Since the lower surface of the bottom wall portion is flat or provided with the second recess narrower than the first recess in the male terminal fitting of the present technique, a wide contact area of the male terminal fitting with the connecting wall can be secured. In this way, the terminal fitting structure with good electrical connection to the female terminal fitting is realized.

DETAILS OF EMBODIMENT OF PRESENT DISCLOSURE

Hereinafter, an embodiment of the present disclosure is described. The present disclosure is not limited to these illustrations and is intended to be represented by claims and include all changes in the scope of claims and in the meaning and scope of equivalents.

Embodiment

A terminal fitting structure according to one embodiment is described with reference to FIGS. 1 to 9. In the following description, a direction indicated by an arrow Z is referred to as an upward direction a direction indicated by an arrow Y is referred to as a forward direction and a direction indicated by an arrow X is referred to as a rightward direction. The above directions are set for the convenience of description. Note that contents of the present disclosure are not limited by the above directions. Further, for a plurality of identical members, only some members may be denoted by a reference sign and the other members may not be denoted by the reference sign.

[Terminal Fitting Structure]

As shown in FIG. 1, a terminal fitting structure 1 is configured by connecting a male terminal fitting 20 and a female terminal fitting 80. The terminal fitting structure 1 is typically configured inside a male connector 10 and a female connector 70 by connecting the male connector 10 including the male terminal fitting 20 and the female connector 7 including the female terminal fitting 80. In this embodiment, a connecting direction of the male connector 10 and the female connector 70 coincides with a front-rear direction. Further, unless particularly specified, a width direction coincides with a lateral direction for the male connector 10 and the female connector 70 in this embodiment.

[Male Connector 10]

The male connector 10 includes the male terminal fittings 20 and a male connector housing 11 for accommodating the male terminal fittings 20. The male connector 10 additionally includes a front retainer 53, mat seals 55 and holders 57.

[Male Terminal Fitting]

The male terminal fitting 20 is an element to be mechanically held in contact with and electrically connected to the female terminal fitting 80. The male terminal fitting 20 is configured by working a thin plate material 49 (see FIG. 9) made of a metal material such as copper or copper alloy into a predetermined shape. As shown in FIG. 1, the male terminal fitting 20 of this embodiment is typically connected to a front end part of wire 50. A wire 50 is connected to a rear end part of the male terminal fitting 20. The wire 50 includes a core wire 51 made of metal and an insulation coating 52 made of insulating synthetic resin for surrounding the outer periphery of the core wire 52. The core wire 51 is exposed by striping the insulation coating 52 in the front end part of the wire 50.

Figure 2:
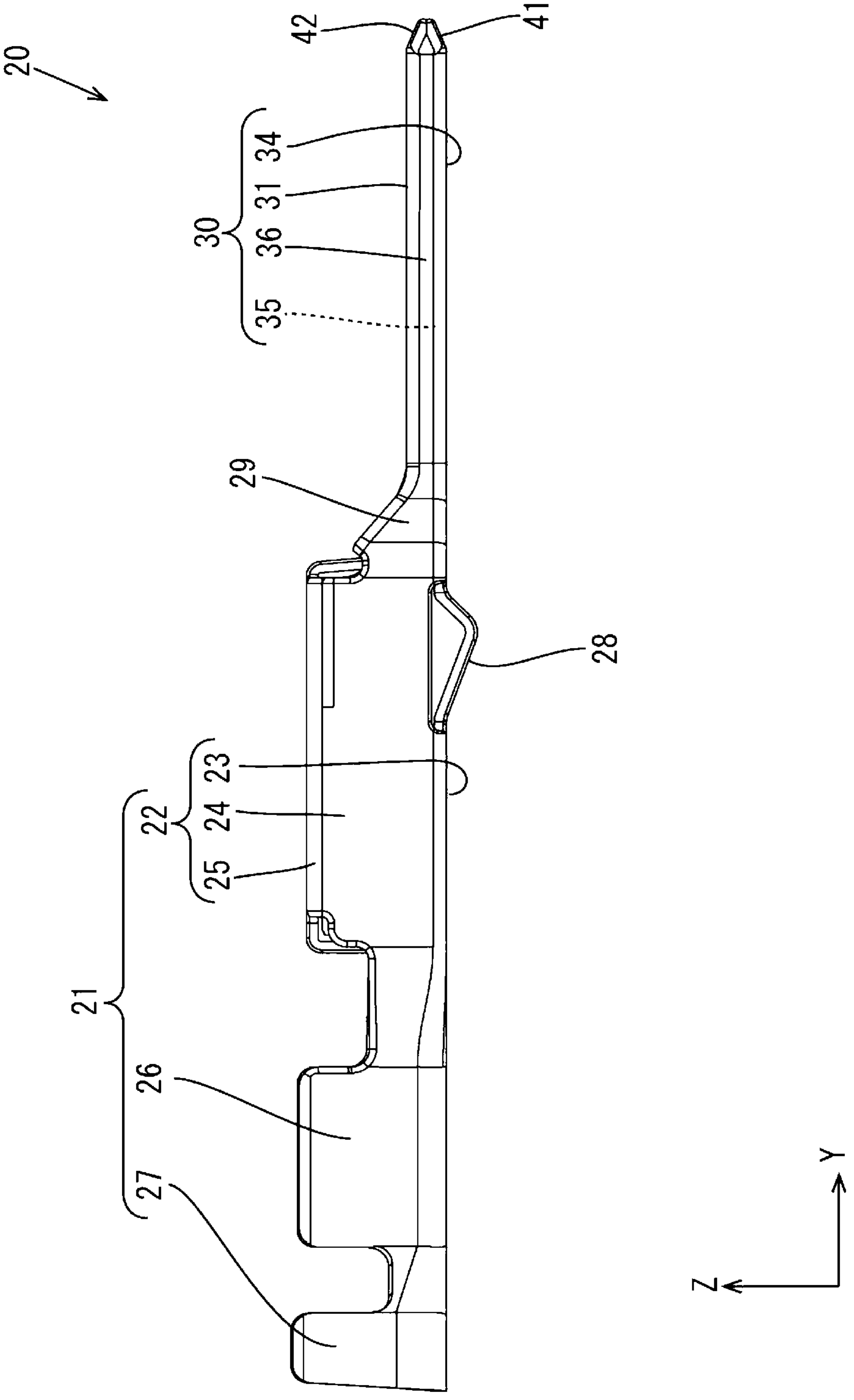
FIG. 2 is a left side view of a male terminal fitting according to the one embodiment.
Figure 3:
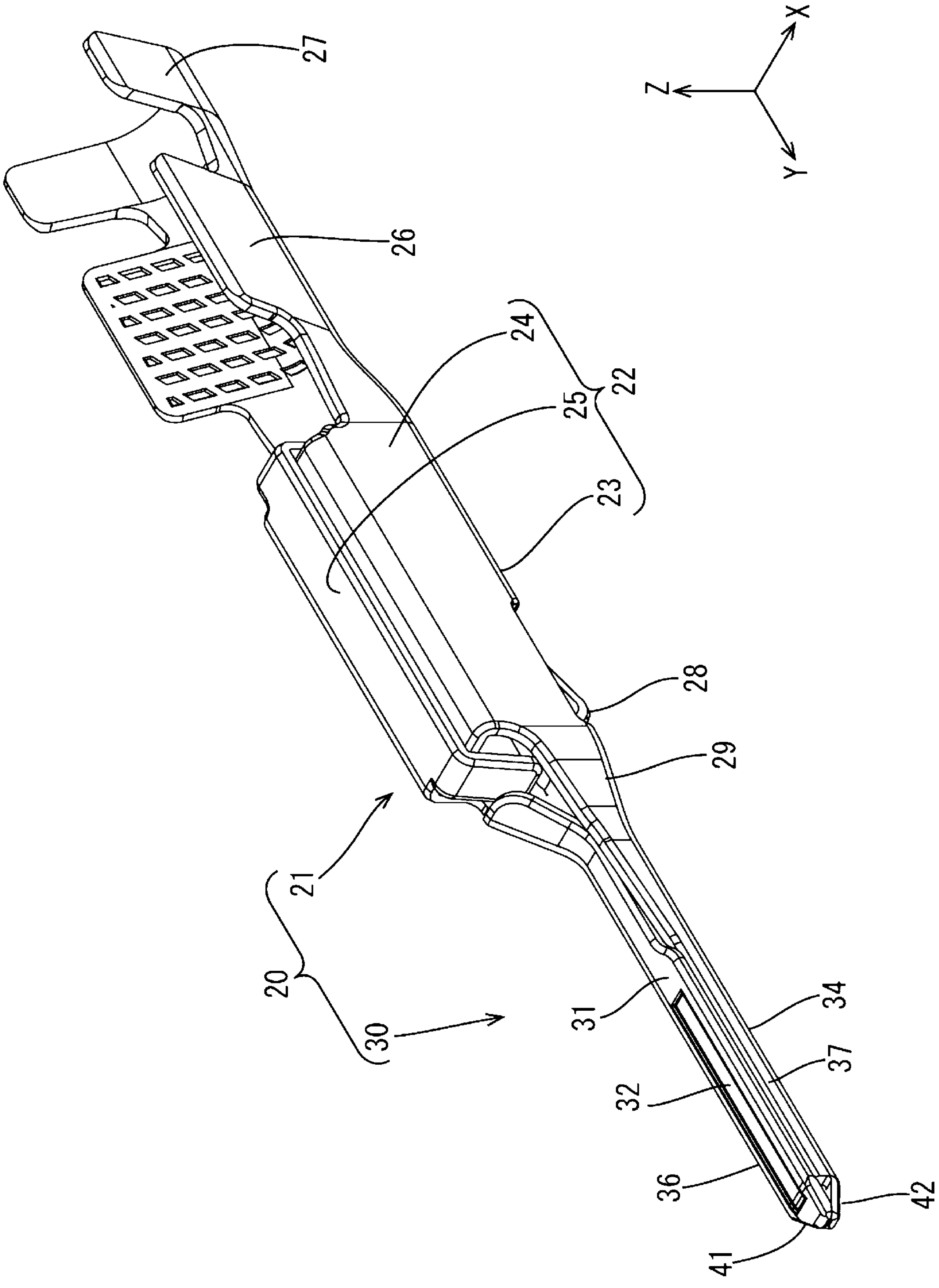
FIG. 3 is a perspective view of the male terminal fitting of FIG. 2.
Figure 4:
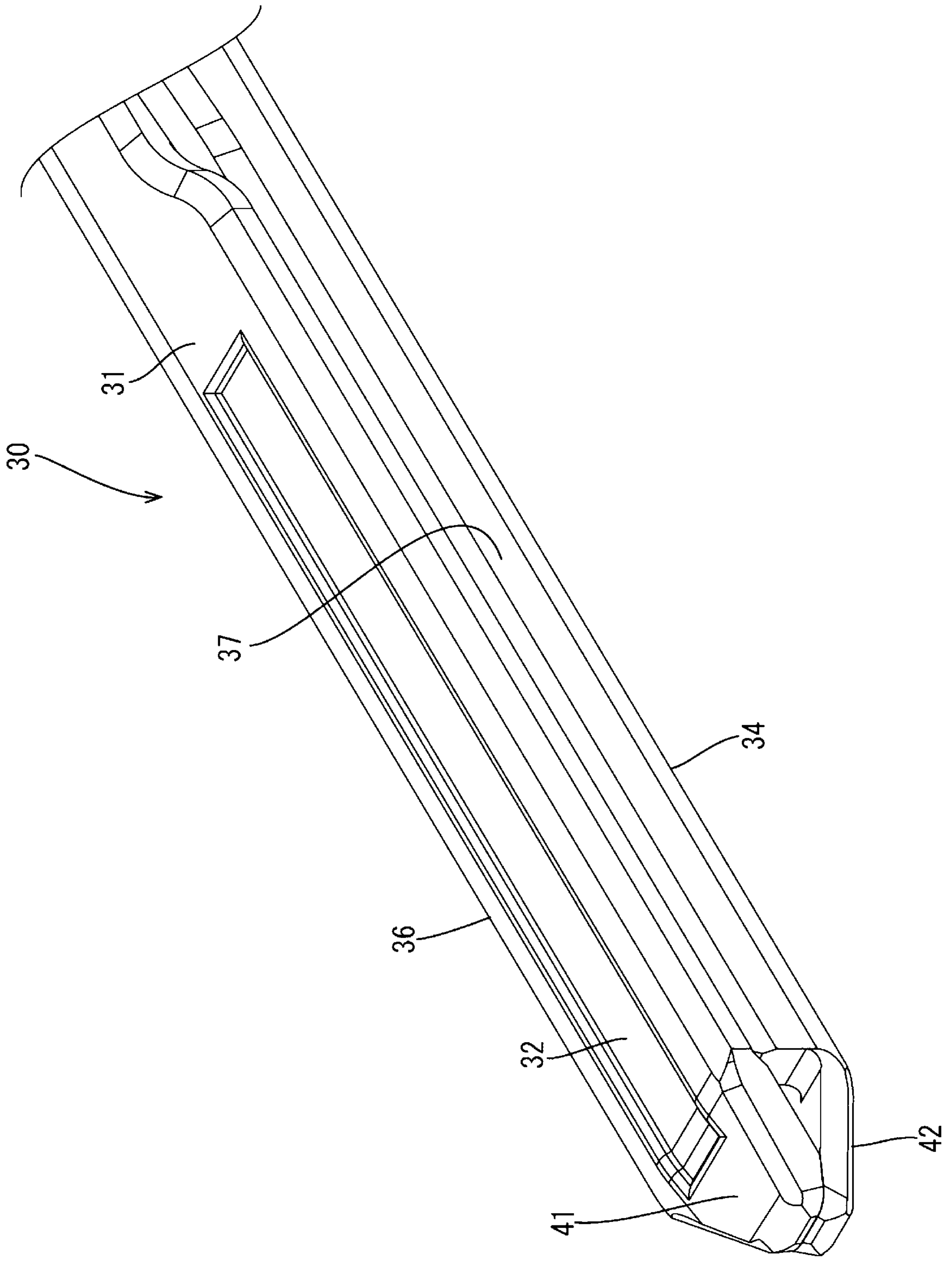
FIG. 4 is a perspective view showing an essential part of a tab portion of the male terminal fitting of FIG. 2.
Figure 5:
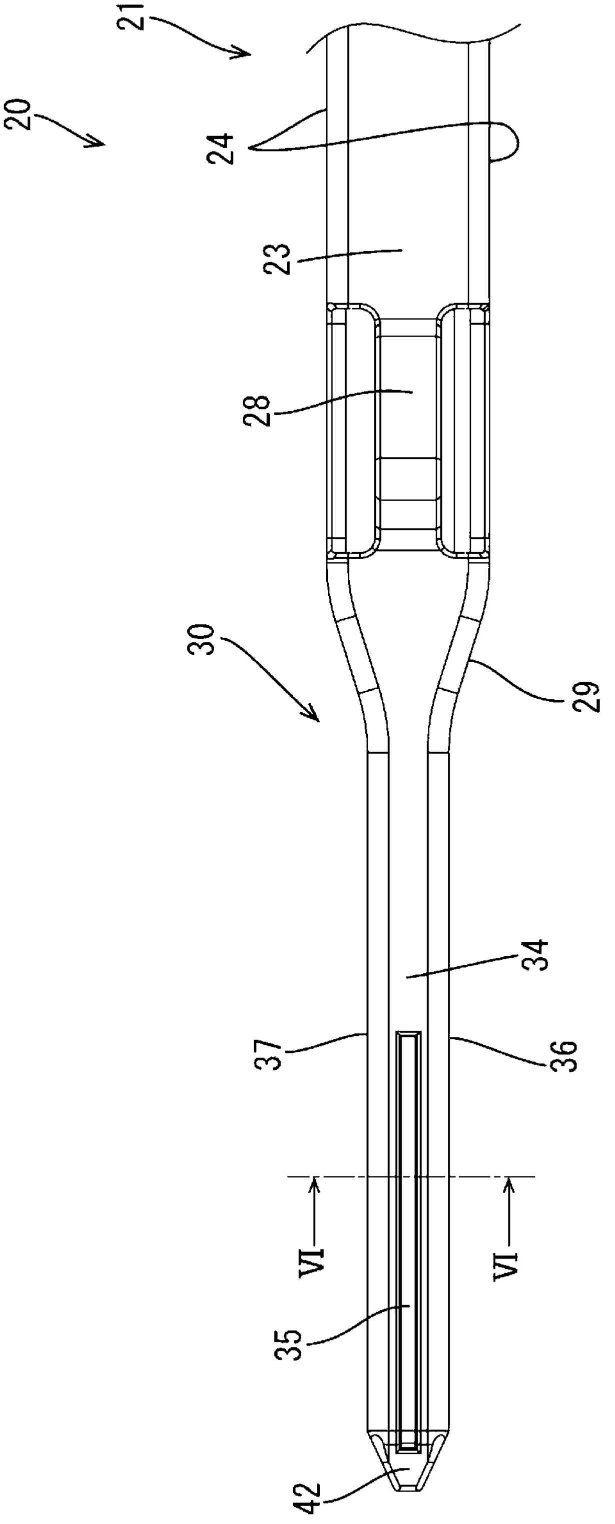
FIG. 5 is a bottom view of an essential part of the male terminal fitting of FIG. 2.

More particularly, the male terminal fitting 20 is formed to be elongated along the front-rear direction and includes a tab portion 30 to be connected to the female terminal fitting 80 and a supporting portion 21 continuous behind the tab portion 30 as shown in FIGS. 2 and 3.

First, the supporting portion 21 is described. The supporting portion 21 is an element for supporting the wire 50 in a tip part. The supporting portion 21 successively includes a body portion 22, a wire barrel portion 26 and an insulation barrel portion 27 from front.

The body portion 22 is an element for properly holding the male terminal fitting 20 in position and posture in the male connector housing 11. The body portion 22 is generally in the form of a rectangular tube. The body portion 22 includes a base wall 23, side walls 24 extending upward from both left and right end parts of the base wall 23 and a covering wall 25 extending from an upper end part of one side wall 24 toward the other side wall 24. The thin plate material 49 is so bent that the respective walls are approximately at 90°. A stabilizer 28 projecting downward is formed at a position near a front end part of the base wall 23. The stabilizer 28 is formed into a chevron shape projecting downward when viewed laterally. The insertion of the male terminal fitting 20 in a vertically inverted posture can be restricted by the stabilizer 28 when the male terminal fitting 20 is inserted into the holder 57 to be described later.

Further, the body portion 22 includes a linking portion 29 in a front part. Each of the base wall 23, a pair of the side walls 24 and the covering wall 25 of the body portion 22 is reduced in height and width toward a front side in the linking portion 29 to be continuous with the tab portion 30 to be described later. The shape of the linking portion 29 is so specified that the position of the tab portion 30 with respect to the body portion 22 is proper.

The wire barrel portion 26 is crimped to the exposed core wire 51 of the wire 50. The wire barrel portion 26 holds the core wire 51 while being electrically and mechanically held in contact with the core wire 51. The wire barrel portion 26 is provided continuously with a rear end part of the base wall 23. The insulation barrel portion 27 is crimped to the insulation coating 52 of the wire 50 and holds the wire 50. The insulation barrel portion 27 is provided continuously with a rear end part of the wire barrel portion 26.

Next, the tab portion 30 is described. The tab portion 30 is an element to be electrically and mechanically held in contact with the female terminal fitting 80. The tab portion 30 is provided continuously with the front end part of the body portion 22. A height of the tab portion 30 is set smaller than that of the body portion 22 in the form of a rectangular tube in the vertical direction. Further, a width of the tab portion 30 is set smaller than that of the body portion 22 in the form of a rectangular tube in the lateral direction. In this embodiment, the tab portion 30 is continuous with the base wall 23 of the body portion 22. The base wall 23 and the tab portion 30 of this embodiment are so formed that the lower surfaces thereof are flush with each other. The tab portion 30 is formed to be elongated forward.

As shown in FIGS. 4 to 7 and the like, the tab portion 30 includes a bottom wall portion 34, a first side wall portion 36, a second side wall portion 37 and an upper wall portion 31. The bottom wall portion 34 extends forward continuously from the front end part of the base wall 23. The first side wall portion 36 continuously rises from a left (one side in the width direction) end part of the bottom wall portion 34. The second side wall portion 37 continuously rises from a right (other side in the width direction) end part of the bottom wall portion 34. The upper wall portion 31 extends continuously toward an upper end part of the second side wall portion 37 from an upper end part of the first side wall portion 36, and overlaps the upper end part of the second side wall portion 37. In the tab portion 30, the right end of the upper wall portion 31 and the upper end of the second side wall portion 37 are free ends having no continuous wall part.

Out of such respective wall portions constituting the tab portion 30, the upper wall portion 31 and the bottom wall portion 34 are parts to be held in contact with the female terminal fitting 80. More specifically, the tab portion 30 is so designed that the upper wall portion 31 contacts a resilient connection piece 86 of the female terminal fitting 80 and the bottom wall portion 34 contacts a connecting wall 84 of the female terminal fitting 80. There is no limitation to this, but widths of the upper wall portion 31 and the bottom wall portion 34 are designed to be larger than heights of the first and second side wall portions 36, 37. For example, a dimension L1 in the width direction of the bottom wall portion 34 of this embodiment is set larger than a dimension L2 in the vertical direction of the first side wall portion 36. In this way, a wider connection area with the female terminal fitting 80 can be secured while a volume occupied by the tab portion 30 is suppressed small.

These upper wall portion 31, first side wall portion 36, bottom wall portion 34 and second side wall portion 37 are connected, and formed into a rectangular tube shape by being bent (possibly including press-molded) to surround a hollow part S. The thin plate material 49 is so bent that the wall portions 31, 34, 36 and 37 continuous with each other are approximately at 90°. The upper wall portion 31 and the bottom wall portion 34 are separated across the hollow part S over the entire tab portion 30 in the front-rear direction. The upper wall portion 31 and the bottom wall portion 34 are supported by the first and second side wall portions 36, 37 to face each other.

Figure 6:
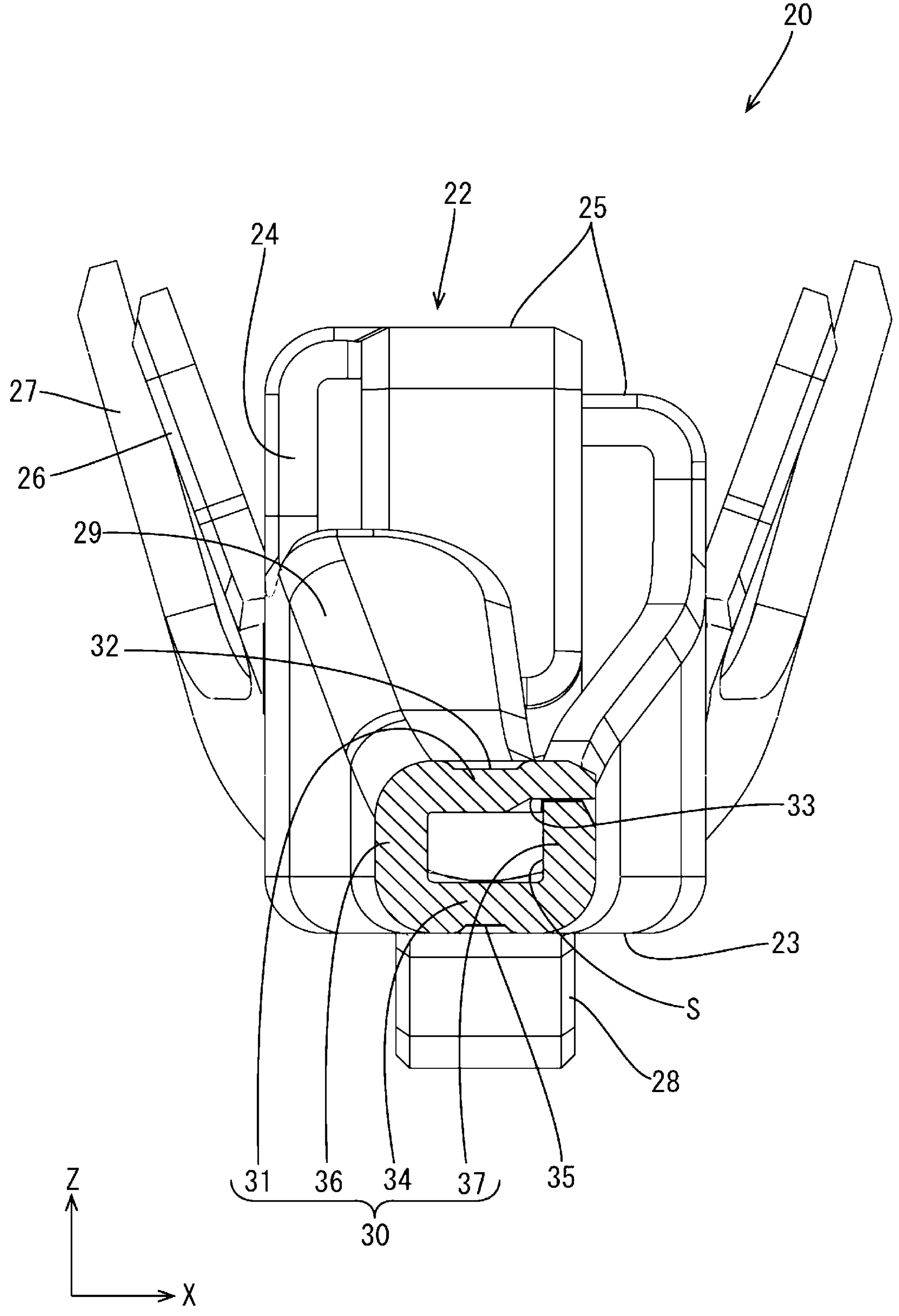
FIG. 6 is a section along VI-VI of FIG. 5.

A step portion 33 recessed upward is provided in a region facing the upper end part of the second side wall portion 37, out of a lower surface 46 of the upper wall portion 31, as shown in FIG. 6 and the like. The upper wall portion 31 is thinner in the step portion 33 than in other parts. The upper end part of the second side wall portion 37 comes into contact with the lower surface 46 of the upper wall portion 31 in the step portion 33. In this way, a larger dimension in the vertical direction of the second side wall portion 37 having a free end can be ensured by as much as a step of the step portion 33, for example, as compared to the facing first side wall portion 36. Such a configuration is effective since working is facilitated in bending the second side wall portion 37 having a relatively small dimension in the vertical direction with respect to the bottom wall portion 34.

Figure 7:
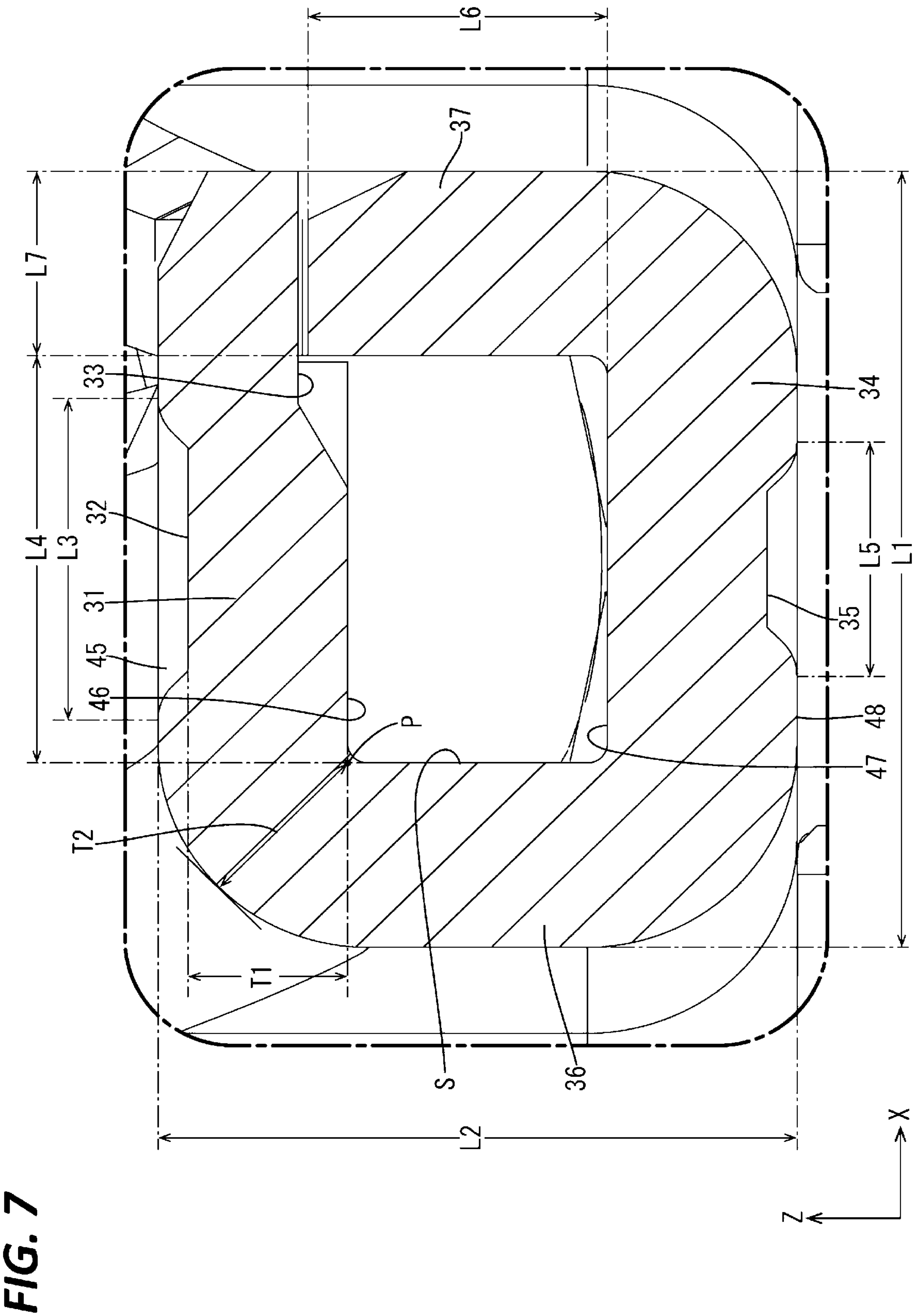
FIG. 7 is an enlarged view showing a cross-section of the tab portion of FIG. 6.

In addition, a dimension L6 in the vertical direction of an upward rising part from an upper surface 47 of the bottom wall portion 34 is designed to be larger than a dimension L7 in the width direction of the second side wall portion 37 as shown in FIG. 7 for the second side wall portion 37 of this embodiment. According to this configuration, a large volume of a part further than a corner part can be ensured for the second side wall portion 37 bent with respect to the bottom wall portion 34 and bending shape can be stabilized. As a result, the occurrence of springback of the second side wall portion 37 in the tab portion 30 can be effectively suppressed.

The tab portion 30 also has a first tip part 41 and a second tip part 42. The first tip part 41 has a triangular shape in a developed state and is continuous with a front end part of the upper wall portion 31 and inclined downward toward the front side. The second tip part 42 has a triangular shape in a developed state and is continuous with a front end part of the bottom wall portion 34 and inclined upward toward the front side. The tips of these first and second tip parts 41, 42 are in contact. As just described, a dimension in the vertical direction of the tab portion 30 is reduced in both upward and downward directions toward the front side, and later-described initial insertion resistance at the time of connection of the female terminal fitting 80 can be reduced.

In the above tab portion 30, a first recess 32 recessed downward is provided in an upper surface 45 of the upper wall portion 31 to be connected to the female terminal fitting 80. The first recess 32 has a function of reducing a contact area with the female terminal fitting 80 and contributes to reducing insertion resistance between the female terminal fitting 80 and the male terminal fitting 10 at the time of connection. In the preset technique, the first recess 32 is provided in the upper surface 45 of the upper wall portion 31 having the free end. Since the right end of the upper wall portion 31 is the free end, there is no design limitation necessary to enhance the shape accuracy of a corner part. Further, since the upper wall portion 31 is not continuous with the second side wall portion 37 and is configured to overlap the upper end part of the second side wall portion 37, the upper wall portion 31 can be wider (longer dimension in the width direction), for example, as compared to the facing bottom wall portion 34 and the other first and second side wall portions 36, 37. From these, it is possible to provide the first recess 32 having a sufficient dimension in the width direction. Further, the provision of the first recess 32 in a part of the flat upper surface 45 is also preferable in that a slide contact surface with the female terminal fitting 80 is flat and does not damage the female terminal fitting 80. In this way, a slide contact area at the time of connection to the female terminal fitting 80 can be reduced and insertion resistance can be reduced.

The first recess 32 is provided to extend along the front-rear direction in a widthwise central part of the upper wall portion 31. In the front-rear direction, the first recess 32 is provided to include parts to be connected to the female terminal fitting 80 at the time of connection to the female terminal fitting 80. That is, a front part of the first recess 32 extends up to the upper surface of the first tip part 41. A rear part of the first recess 32 is, for example, provided up to a position behind the part to be connected to the resilient connection piece 86 of the female terminal fitting 80 to be described later. By this configuration, the insertion resistance can be reliably reduced from an initial stage to an end of connection to the female terminal fitting 80.

The first recess 32 is designed to be narrower than the parts to be connected to the female terminal fitting 80 on both left and right sides in the width direction (lateral direction). In other words, the first recess 32 is so designed that the female terminal fitting 80 can be connected to the upper surface 45 of the upper wall portion 31 across the first recess 32 on both sides in the width direction. In this way, for the male terminal fitting 20 having the hollow part S, the insertion resistance at the time of connection to the female terminal fitting 80 can be reduced while electrical connection to the female terminal fitting 80 is ensured. In a typical configuration, a dimension L3 in the width direction is set smaller than a separation distance L4 between the first and second side wall portions 36, 37. The dimension L3 can be, for example, 80% or less (preferably 77.5% or less, typically 75% or less) of the separation distance L4. On the other hand, in terms of reducing the insertion resistance, the width of the first recess 32 is preferably large. Therefore, the dimension L3 can be, for example, 45% or more (preferably 48.7% or more, typically 50% or more) of the separation distance L4. By this configuration, the insertion resistance at the time of connection to the female terminal fitting 80 can be more suitably reduced.

Further, in terms of enhancing electrical conductivity during contact with the female terminal fitting 80, the dimension L3 in the width direction of the first recess 32 may be typically 45% or less (preferably 40% or less, e.g. 38.7% or less) of the dimension L1 in the width direction of the bottom wall portion 34. Further, in terms of reducing the insertion resistance, the dimension L3 in the width direction of the first recess 32 can be typically 25% or more (preferably 29.3% or more, e.g. 30% or more) of the dimension L1 in the width direction of the bottom wall portion 34.

Note that a depth of the first recess 32 is not particularly limited in such a range that the bottom surface of the first recess 32 does not contact the female terminal fitting 80 at the time of connection to the female terminal fitting 80. The depth of the first recess 32 can be typically about 2% or more (preferably 2.73% or more, e.g. 3% or more) and typically 27.5% or less (preferably 20% or less, e.g. 10% or less) of a thickness of the upper wall portion 31 as a guide.

Further, when the first recess 32 is provided near the corner part between the upper wall portion 31 and the first side wall portion 36, it is difficult to form the first recess 31 simultaneously with bending. Thus, bending is performed after the first recess 32 is formed in the thin plate material 49. A thickness T1 in the first recess 32 of the upper wall portion 31 in the present disclosure is set smaller than a maximum thickness T2 in the corner part between the upper wall portion 31 and the first side wall portion 36. The thickness T1 is, for example, 95% or less (preferably 92.8% or less, typically 90% or less) of the maximum thickness T2. In this way, a situation where the female terminal fitting 80 slides in contact with the first recess 32 can be reliably prevented and the insertion resistance at the time of connection can be reliably reduced. Further, the thickness T1 in the first recess 32 of the upper wall portion 31 may be, for example, 60% or more (preferably 64% or more, typically 70% or more) of the maximum thickness T2 in the corner part between the upper wall portion 31 and the first side wall portion 36. According to this configuration, the shape accuracy of the corner part can be ensured and the strength of the tab portion 30 can be enhanced by ensuring the thickness of the upper wall portion 31.

A second recess 35 recessed upward is provided in a lower surface 46 of the bottom wall portion 34. The second recess 35 has a function of reducing a contact area with the female terminal fitting 80 and contributes to reducing the insertion resistance between the female terminal fitting 80 and the male terminal fitting 10 at the time of connection. In this technique, the second recess 35 is provided also in the lower surface 48 of the bottom wall portion 34. The second recess 35 is provided to extend along the front-rear direction in a widthwise central part of the bottom wall portion 34. In the front-rear direction, the second recess 35 is provided to include parts to be connected to the female terminal fitting 80 at the time of connection to the female terminal fitting 80. A front part of the second recess 35 extends up to the upper surface of the second tip part 42. A rear part of the second recess 35 is, for example, provided up to a position behind the parts to be held in contact with the connecting wall 84 of the female terminal fitting 80 to be described later. By this configuration, the insertion resistance can be reliably reduced from the initial stage to the end of connection to the female terminal fitting 80.

Since the bottom wall portion 34 has the corner parts on both ends in the width direction, a dimension L5 in the width direction of the second recess 35 is set smaller than the dimension L3 in the width direction of the first recess 32. By adopting this configuration, the bottom wall portion 34 can secure a wide contact area with the female terminal fitting 80 and can improve electrical connection. In a typical configuration, the dimension L5 in the width direction of the second recess 35 can be, for example, 85% or less (preferably 81.4% or less, typically 75% or less) of the dimension L3 in the width direction of the first recess 32. Note that the dimension L5 of the second recess 35 is preferably large in terms of reducing the insertion resistance at the time of connection to the female terminal fitting 80. From such a viewpoint, the dimension L5 in the width direction of the second recess 35 may be, for example, 55% or more (preferably 58% or more, typically 60% or more) of the dimension L3 in the width direction of the first recess 32. In this way, electrical connection to the female terminal fitting 80 and a reduction in insertion resistance can be combined at a high level.

Note that a dimension (entire dimension) in the width direction of the lower surface 48 of the bottom wall portion 34 can be adopted as the dimension L1 in the width direction of the bottom wall portion 34. A dimension (entire dimension) in the vertical direction of an outer surface (left surface) of the first side wall portion 36 can be adopted as the dimension L2 in the vertical direction of the first side wall portion 36. A dimension (entire dimension) in the width direction of the first recess 32 in the upper surface 45 of the upper wall portion 31 can be adopted as the dimension L3 in the width direction of the first recess 32. A distance between the inner surface (right surface) of the first side wall portion 36 and the inner surface (left surface) of the second side wall portion 37 can be adopted as the separation distance L4. A dimension (entire dimension) in the width direction of the second recess 35 in the lower surface 48 of the bottom wall portion 34 can be adopted as the dimension L5 in the width direction of the second recess 35. A dimension from the upper surface 47 of the bottom wall portion 34 to the upper end part of the second side wall portion 37 can be adopted as the dimension L6 in the vertical direction of the upward rising part of the second side wall portion 37. A dimension in the width direction of the second side wall portion 37 along a tangent (tangent plane) to the upper surface 47 of the bottom wall portion 34 can be adopted to as the dimension L7 in the width direction of the second side wall portion 37.

Further, a dimension in a thickness direction in the first recess 32 of the upper wall portion 31 (e.g. arithmetic average value of dimensions measured at three points) can be adopted as the thickness T1 in the first recess 32 of the upper wall portion 31. A maximum dimension between an intersection P of the lower surface 46 of the upper wall portion 31 and the inner surface of the first side wall portion 36 and a visible outline of a curved surface from the upper wall portion 31 to the first side wall portion 36 can be adopted as the maximum thickness T2 in the corner part between the upper wall portion 31 and the first side wall portion 36. This maximum thickness T2 generally corresponds to a radius of curvature of the outer surface in this corner part. A value measured based on a cross-sectional image of the tab portion 30 orthogonal to the front-rear direction can be adopted as each of the above dimensions.

[Male Connector Housing]

The male connector housing 11 is in the form of a substantially rectangular parallelepiped case flat in the vertical direction and extending in the lateral direction. The male connector housing 11 is formed by injection molding an insulating synthetic resin. A tower portion 13 for holding a plurality of the male terminal fittings 20 is provided in a central part in the front-rear direction inside the male connector housing 11.

A receptacle 12 is provided in a front end part of the male connector housing 11. The receptacle 12 accommodates and holds the mating female connector 70 disposed in front of the tower portion 13 in a connected state. The receptacle 12 is in the form of a rectangular tube open forward and formed to surround a front part of the tower portion 13.

The tower portion 13 is an element for holding the male terminal fittings 20 in a posture along the front-rear direction inside the male connector housing 11. A window portion 18 through which the tab portions 30 of the male terminal fittings 20 are inserted is provided in a front end part of the tower portion 13. The tower portion 13 is provided with cavities 14 capable of accommodating the supporting portions 21 of the male terminal fittings 20. Further, the tower portion 13 has an intermediate wall 15 and the cavities 14 are largely divided in two upper and lower stages by this intermediate wall 15. In FIG. 1, a state where one male terminal fitting 20 is accommodated in the cavity 14 in the upper stage is shown and the male terminal fittings 20 are not shown for a plurality of the other cavities 14. The cavities 14 are arrayed in the lateral direction in the tower portion 13 so that a plurality of (e.g. eight in this embodiment) male terminal fittings 20 can be arrayed and accommodated in the lateral direction in each stage. The shape of the cavity 14 is not limited as long as the male terminal fitting 20 can be accommodated in a predetermined posture.

A locking lance 16 extending forward from the inner wall of the cavity 14 is provided inside the cavity 14. The locking lance 16 is so formed that a front end part is deflectable and deformable in the vertical direction. With the male terminal fitting 20 accommodated at a proper position in the cavity 14, the locking lance 16 can be deflected to a position to be locked to the body portion 22 of the male terminal fitting 20 from behind. In this way, the locking lance 16 can restrict a rearward displacement of the male terminal fitting 20 and holds the male terminal fitting 20 in a retained state in the cavity 14.

The front retainer 53 is fit to a front end part of the tower portion 13 from front. The front retainer 53 is made of insulating synthetic resin. The front retainer 53 includes locking portions 54 extending rearward. With the front retainer 53 sufficiently fit to the tower portion 13, the locking portions 54 are disposed in deflection spaces for the locking lances 16, so that it can be confirmed that the locking lances 16 are locking the male terminal fittings 20. In this way, the male terminal fittings 20 are doubly locked in the male connector housing 11 by the locking lances 16 and the front retainer 53 with the front retainer 53 fit to the tower portion 13.

The mat seals 55 are accommodated in a rear end part of the male connector housing 11. The mat seal 55 is made of synthetic rubber and formed with a plurality of insertion holes 56 penetrating in the front-rear direction. The wires 50 fixed to rear parts of the male terminal fittings 20 are inserted through the insertion holes 56 of the mat seal 55, and the mat seal 55 holds the wires 50 while being held in close contact with the outer peripheries of the wires 50 in a liquid-tight manner.

The holders 57 are assembled at positions behind accommodation regions for the mat seals 55 in the rear end part of the male connector housing 11. By attaching the holders 57 to the male connector housing 11, the mat seals 55 are retained and held in male connector housing 11.

[Female Connector]

Figure 8:
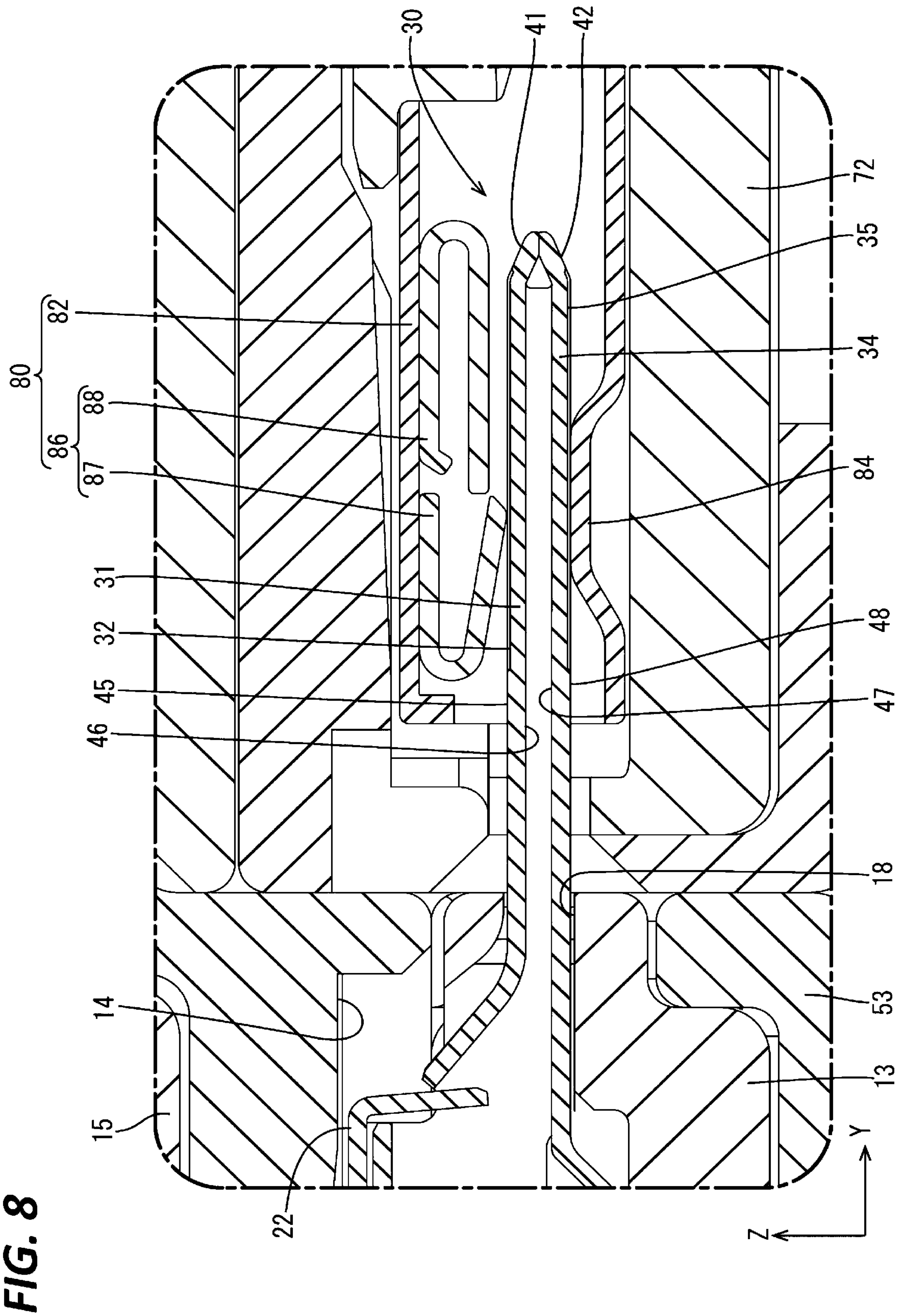
FIG. 8 is an enlarged view showing an essential part of the terminal fitting structure of FIG. 1.
Figure 9:
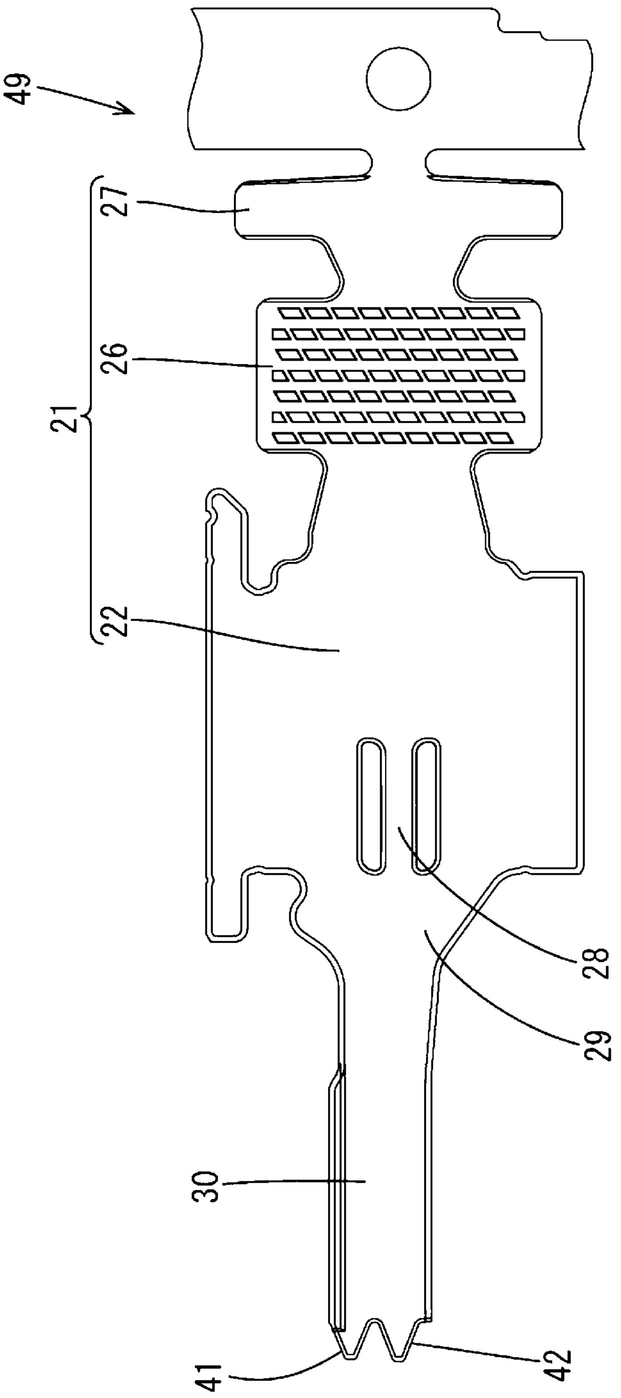
FIG. 9 is a development showing a plate material before being bent.

As shown in FIG. 8 and the like, the female connector 70 includes the female terminal fittings 80 and a female connector housing 72 for accommodating the female terminal fittings 80. The female connector housing 72 accommodates a plurality of the female terminal fittings 80 at positions corresponding to the mating male terminal fittings 20 to be connected. The female connector housing 72 is accommodated into the receptacle 12 of the male connector 10 and disposed in front of the tower portion 13.

[Female Terminal Fittings]

The female terminal fitting 80 includes a connecting tube portion 82 into which the male terminal fitting 20 is inserted, and the resilient contact piece 86 disposed inside the connecting tube portion 82. The connecting tube portion 82 is formed into a rectangular tube long in the front-rear direction by working a thin plate material made of metal such as copper or copper alloy into a predetermined shape. The resilient contact piece 86 includes two resilient pieces 87, 88 obtained by respectively forming plate pieces made of metal such as copper or copper alloy into a V shape and a U shape. The V-shaped resilient contact piece 87 is fixed to the inner bottom surface of the connecting tube portion 82 in a posture, in which a bent portion is disposed behind, near a rear end part of the connecting tube portion 82. The U-shaped resilient contact piece 88 is fixed to the inner bottom surface of the connecting tube portion 82 in a posture, in which a curved portion is disposed in front, in front of the V-shaped resilient piece 87. Further, the connecting tube portion 82 includes the flat connecting wall 84 projecting upward at a position facing the resilient contact piece 86. As described above, the resilient contact piece 86 is connected to the upper wall portion 31 of the male terminal fitting 20 and the connecting wall 84 is connected to the bottom wall portion 34 of the male terminal fitting 20.

Note that the lower surface of the connecting wall 84 is a flat surface and includes, for example, no projection or the like projecting downward. Further, a surface of each resilient contact piece 86 disposed uppermost is a flat surface in the width direction and includes, for example, no projection or the like projecting upward.

With the male connector 10 and the female connector 70 connected, the male terminal fitting 20 is inserted into the connecting tube portion 82 as shown in FIG. 1. Then, the male terminal fitting 20 is sandwiched between the resilient contact piece 86 and the connecting wall 84, thereby being electrically connected to the female terminal fitting 80. When the male terminal fitting 20 is inserted into the connecting tube portion 82, the upper wall portion 31 comes into contact with the resilient contact piece 86. Further, when the male terminal fitting 20 is sed into the connecting tube portion 82, the bottom wall portion 34 comes into contact with the connecting wall 84.

[Manufacturing Process of Connector Structure]

First, an example of a manufacturing process of the terminal fitting structure 1 according to this embodiment is described. The manufacturing process of the terminal fitting structure 1 is not limited to the one described below.

First, a manufacturing process of the male connector 10 is described.

First, the thin plate material as a manufacturing material of the male terminal fitting 20 is stamped into a rough developed shape of the male terminal fitting 20. Subsequently, press-molding for forming the first recess 32 and the second recess 35 at predetermined positions, knurling for twilling the wire barrel portion 26 and the like are performed. Then, the thin plate material 49 is press-molded and stamped into the developed shape of the male terminal fitting 20 shown in FIG. 9, and a stamped piece of the thin plate material 49 is partially bent. Subsequently, the body portion 22, the tab portion 30 and the first and second tip parts 41, 42 are formed into a predetermined shape by bending and press-working. Note that bending and press-working may be partially simultaneously performed.

Subsequently, the male terminal fitting 20 is mounted on the stripped front end part of the wire 50. In particular, the wire barrel portion 26 is crimped to the core wire 51 of the wire 50 and the insulation barrel portion 27 is crimped to the insulation coating 52 of the wire 50 (see FIG. 1).

On the other hand, the mat seals 15 are inserted into accommodation recesses 17 of the male connector housing 11 and, then, the holders 57 are attached to the rear end part of the male connector housing 11 from behind. Further, the front retainer 53 is partially locked (also incompletely connected or the like) to the tower portion 13 of the male connector housing 11 from front.

The male terminal fitting 20 is inserted into the male connector housing 11 through the holder 57 on a rear side in such a posture that the tab portion 30 is disposed in front and the stabilizer 28 is disposed below. The tab portion 30 of the male terminal fitting 20 projects forward of the tower portion 13 through the window portion 18 of the tower portion 13 and the supporting portion 21 thereof is accommodated into the cavity 14. In this way, the locking lance 16 is resiliently locked to the rear end part of the body portion 22 of the male terminal fitting 20 from behind and the male terminal fitting 20 is retained and held in the male connector housing 11. Further, the mat seal 55 is held in close contact with the outer periphery of the insulation coating 52 of the wire 50, thereby sealing between the wire 50 and the mat seal 55 in a liquid-tight manner.

Thereafter, the front retainer 53 is moved to the back and fully locked to the tower portion 13, whereby the male terminal fittings 20 are doubly locked by the locking portions 54 of the front retainer 53. In the above way, the male connector 10 is completed (see FIG. 1).

Next, the construction of the terminal fitting structure 1, i.e. the connection of the male terminal fitting 20 and the female terminal fitting 80, is described. The prepared female connector 70 is fit into the receptacle 12 of the male connector 10. At this time, the female connector 70 is fit in such a posture that the resilient connection pieces 86 of the female terminal fittings 80 are disposed above and the connecting walls 84 are disposed below. In this way, the tab portions 30 of the male terminal fittings 20 projecting forward of the tower portion 13 are inserted into the connecting tube portions 82 of the female terminal fittings 80 and advance relatively forward between the resilient connection pieces 86 and the connecting walls 84. As shown in FIG. 8, the male terminal fitting 20 advances relatively forward while the upper wall portion 31 of the tab portion 30 slides in contact with the resilient connection piece 86 and the bottom wall portion 34 slides in contact with the connecting wall 84. By the contact of the female connector housing 72 with the front retainer 53, the male connector 10 and the female connector 70 are connected. In the above way, the male terminal fitting 20 and the female terminal fitting 70 are connected to configure the terminal fitting structure 1.

[Functions and Effects of Embodiment]

Next, functions and effects of this embodiment are described.

In the configuration of this embodiment, the first recess 32 is provided in the upper surface 45 of the upper wall portion 31 having one end serving as the free end not continuous with the second side wall portion 37. Since the upper wall portion 31 is configured to overlap the upper end part of the second side wall portion 37, the upper wall portion 31 can be wider, for example, than the facing bottom wall portion 34 and the first side wall portion 36 and the wide first recess 32 can be provided without impairing the shape accuracy of the corner part of the first side wall portion 36. By providing the first recess 32 in the upper wall portion 31 in this way, insertion resistance at the time of connection to the female terminal fitting 80 can be reduced. Further, the upper surface 45 of the upper wall portion 31 is electrically connected to the female terminal fitting 80 on both sides of the first recess 32. In this way, the insertion resistance at the time of connection to the female terminal fitting 80 can be reduced while electrical connection to the female terminal fitting 80 is ensured for the male terminal fitting 20 having the hollow part.

Further, according to the above configuration, when the male terminal fitting 20 is inserted into the connecting tube portion 82 of the female terminal fitting 80, the upper wall portion 31 comes into contact with the resilient connection piece 86. The shape of the resilient connection piece 86 is designed to resiliently contact the tab portion 30 of the male terminal fitting 20 from above. Thus, a large insertion resistance is generated between the upper wall portion 31 and the resilient connection piece 86, for example, than between the bottom wall portion 34 and the connecting wall 84. Here, since the upper wall portion 31 is formed with the first recess 32 wider, for example, than the second recess 35, the insertion resistance generated between the upper wall portion 31 and the resilient connection piece 86 can be effectively reduced. Further, since the upper wall portion 31 is configured to overlap the second side wall portion 37 from above, the upper wall portion 31, to which a downward force is applied, can be reliably supported by the second side wall portion 37 even if the resilient connection piece 86 resiliently contacts the upper wall portion 31 from above due to connection. In this way, the terminal fitting structure 1 is realized in which the deformation of the male terminal fitting 20 and the like due to a resilient force of the resilient connection piece 86 of the female terminal fitting 80 are suppressed and the electrical connection of the male terminal fitting 20 and the female terminal fitting 80 can be stably maintained.

Further, according to the above configuration, when the male terminal fitting 20 is inserted into the connecting tube portion 82 of the female terminal fitting 80, the bottom wall portion 34 comes into contact with the connecting wall 84. In the male terminal fitting 20 of the present disclosure, the lower surface 48 of the bottom wall portion 34 is flat and the second recess 35 narrower than the first recess 35 is provided in the widthwise center of the lower surface 48. Thus, a wide electrical contact area of the bottom wall portion 34 and the connecting wall 84 can be secured while insertion resistance generated between the bottom wall portion 34 and the connecting wall 84 is reduced by the second recess 35. In this way, the terminal fitting structure 1 with good electrical connection is realized.

The above effects of the present disclosure are preferable since advantages are particularly clearly exhibited in the case of adopting a terminal fitting including no projection on mutually facing surfaces of the resilient connection piece 86 and the connecting wall 84 as the female terminal fitting 80 constituting the terminal fitting structure 1.

Further, the above effects of the present disclosure are preferable since the advantages are particularly clearly exhibited if being applied to the male terminal fitting 20 in which a recess cannot be easily provided in an electrical contact surface with the female terminal fitting 80. Male terminal fittings having one of the following features or two or more of the following features in combination can be, for example, cited as such a male terminal fitting 20.

- A male terminal fitting in which a plate thickness of a metal plate material used as a manufacturing material is 1 mm or less (e.g. 0.9 mm or less, 0.8 mm or less or 0.7 mm or less).
- A male terminal fitting in which thicknesses of wall portions and the like constituting each component are 0.6 mm or less (e.g. 0.5 mm or less, 0.4 mm or less or 0.3 mm or less) and 0.1 mm or more (e.g. 0.2 mm or more).
- A male terminal fitting in which a dimension in the width direction of a tab portion is 1.5 mm or less (e.g. 1 mm or less, 0.9 mm or less).
- A male terminal fitting in which a dimension in the thickness direction of a tab portion is 1 mm or less (e.g. 0.9 mm or less, 0.8 mm or less or 0.7 mm or less).

Other Embodiments (1) In the male terminal fitting 20 of this embodiment, the rear end part of the bottom wall portion 34 of the tab portion 30 is continuous with the front end part of the supporting portion 21 (base wall 31). However, in the tab portion 30, any one of the upper wall portion 31, the bottom wall portion 34, the first side wall portion 36 and the second side wall portion 37 may be continuous with the supporting portion 21. Further, the wall portion continuous with the tab portion 30 is not limited to the base wall 23 of the supporting portion 21, but may be the side wall 24, the covering wall 25 or the like.

(2) In the male terminal fitting 20 of this embodiment, each of the second recess 35 and the step portion 33 of the upper wall portion 31 may be independently omitted.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A male terminal fitting, comprising:
- a tab portion to be connected to a female terminal fitting; and
- a supporting portion continuous with the tab portion along a connecting direction to the female terminal fitting, wherein:
- the tab portion extends along the connecting direction and includes
  - a bottom wall portion,
  - a first side wall portion continuously rising from one end part in a width direction intersecting the connecting direction, out of the bottom wall portion,
  - a second side wall portion continuously rising from the other end part in the width direction, and
  - an upper wall portion continuously extending from an upper end part of the first side wall portion toward an upper end part of the second side wall portion and overlapping the upper end part of the second side wall portion,
- a first recess extending along the connecting direction and recessed downward is provided in a central part in the width direction in an upper surface of the upper wall portion, and
- a step portion is formed in a lower surface of the upper wall portion and is configured to receive the upper end part of the second side wall portion.

2. The male terminal fitting according to claim 1, wherein a dimension in the width direction of the first recess is 45% or more and 80% or less of a separation distance between the first and second side wall portions.

3. The male terminal fitting according to claim 1, wherein a thickness in the first recess of the upper wall portion is 60% or more and 95% or less of a maximum thickness in a corner part between the upper wall portion and the first side wall portion.

4. The male terminal fitting according to claim 1, wherein:
- a dimension in the width direction of the bottom wall portion is larger than a dimension in a vertical direction of the first side wall portion,
- a second recess extending along the connecting direction and recessed upward is provided in a central part in the width direction in a lower surface of the bottom wall portion, and
- a dimension in the width direction of the second recess is smaller than that of the first recess.

5. The male terminal fitting according to claim 4, wherein the dimension in the width direction of the second recess is 55% or more and 85% or less of the dimension in the width direction of the first recess.

6. The male terminal fitting according to claim 1, comprising:
- a first tip part continuous with a front end of the upper wall portion and inclined downward toward a front side; and
- a second tip part continuous with a front end of the bottom wall portion, inclined upward toward the front side and in contact with the first tip part, the first recess extending up to an upper surface of the first tip part.

7. The male terminal fitting according to claim 1, wherein the step portion is recessed upward and is provided in a region overlapping the upper end part of the second side wall portion, out of the lower surface of the upper wall portion.

8. The male terminal fitting according to claim 1, wherein a dimension in a vertical direction of an upward rising part of the second side wall portion from an upper surface of the bottom wall portion is larger than a dimension in the width direction of the second side wall portion.

9. A terminal fitting structure, comprising:
- the male terminal fitting according to claim 1; and
- a female terminal fitting to be connected to the male terminal fitting, wherein:
the female terminal fitting includes
a connecting tube portion,
the male terminal fitting being inserted into the connecting tube portion, and
a resiliently deformable resilient connection piece disposed inside the connecting tube portion,
the connecting tube portion has a connecting wall at a position facing the resilient connection piece, and
the male terminal fitting is sandwiched and electrically connected between the resilient connection piece and the connecting wall.

10. The terminal fitting structure according to claim 9, wherein the upper wall portion comes into contact with the resilient connection piece when the male terminal fitting is inserted into the connecting tube portion.

11. The terminal fitting structure according to claim 9, wherein the bottom wall portion comes into contact with the connecting wall when the male terminal fitting is inserted into the connecting tube portion.

* * * * *